United States Patent

Micca et al.

[11] Patent Number: 5,383,728
[45] Date of Patent: Jan. 24, 1995

[54] SEALING SHIELD, PARTICULARLY FOR ROLLING BEARINGS

[75] Inventors: Mario Micca, Turin; Vito C. Maselli, Modugno, both of Italy

[73] Assignee: SKF Industries S.p.A., Turin, Italy

[21] Appl. No.: 972,381

[22] Filed: Nov. 5, 1992

[30] Foreign Application Priority Data

Nov. 6, 1991 [IT] Italy .......................... TO91U 000274

[51] Int. Cl.[6] ............................................. F16C 33/76
[52] U.S. Cl. .................... 384/482; 277/152; 384/484
[58] Field of Search .............. 384/477, 482, 484, 485, 384/486; 277/227, DIG. 6, 37, 152, 94; 428/516; 156/297

[56] References Cited

U.S. PATENT DOCUMENTS

| | | | |
|---|---|---|---|
| 3,709,572 | 1/1973 | Pethis | 384/482 |
| 3,904,470 | 9/1975 | Fukuki et al. | 428/516 X |
| 4,066,269 | 1/1978 | Linne | 277/DIG. 6 |
| 4,261,583 | 4/1981 | de Vries et al. | 277/181 X |
| 4,650,195 | 3/1987 | Dreschmann et al. | 384/477 X |
| 4,733,978 | 3/1988 | Colanzi et al. | 384/482 |
| 4,805,919 | 2/1989 | Wiblyi et al. | 384/477 X |

Primary Examiner—Daniel P. Stodola
Attorney, Agent, or Firm—Burns, Doane, Swecker & Mathis

[57] ABSTRACT

A sealing shield, particularly for rolling bearings, of the type wherein relatively soft, elastic peripheral portions are secured to a relatively rigid intermediate portion; the intermediate portion consisting of a single rigid annular insert formed from a synthetic plastic polymer; and the relatively soft peripheral portions being preferably in the form of independent elements co-molded on to the annular insert and formed from a mixture of an elastomer and the same synthetic plastic polymer from which the annular insert is formed. In a preferred embodiment, the annular insert has a trapezoidal radial cross-section.

9 Claims, 1 Drawing Sheet

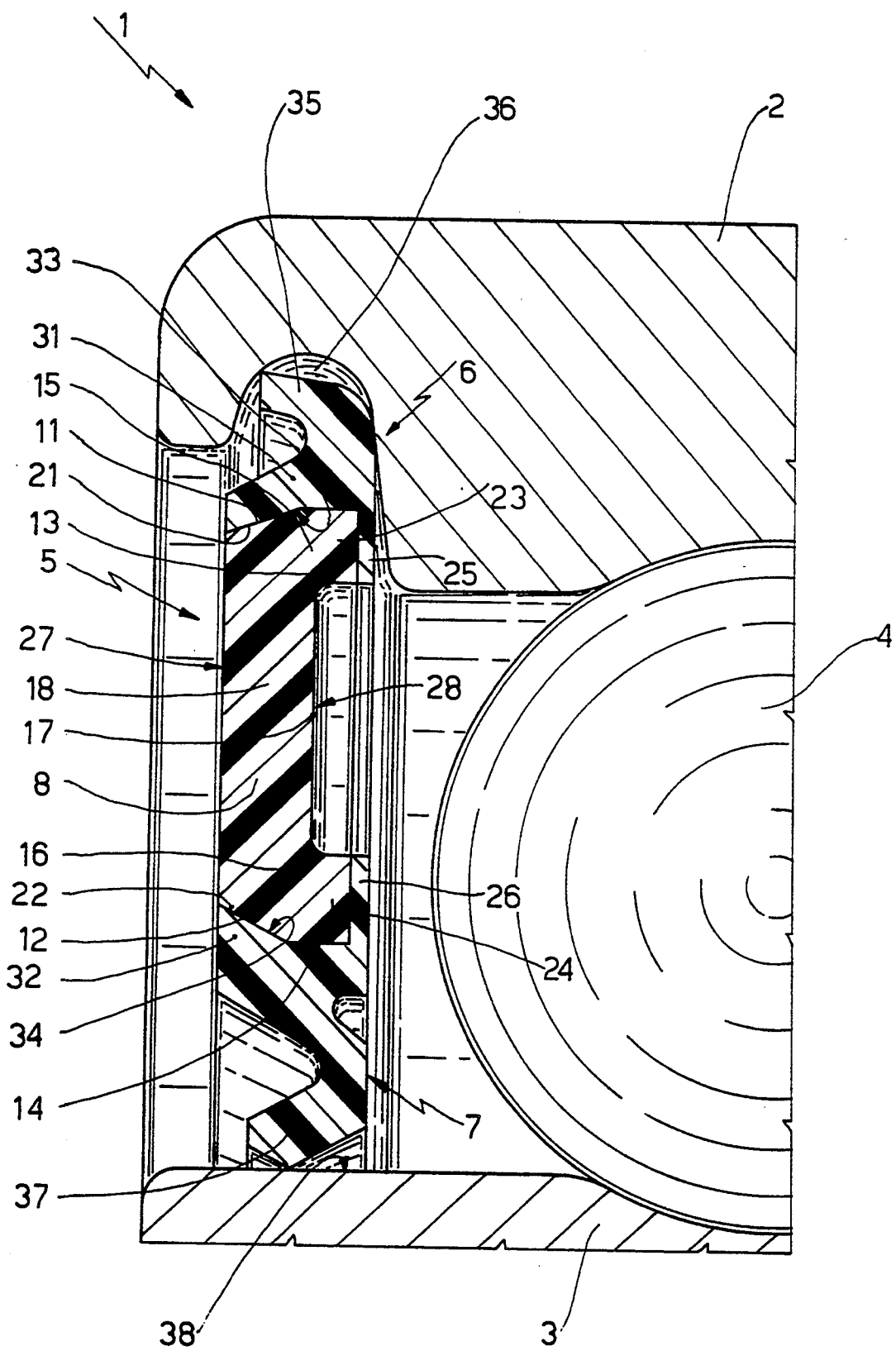

SEALING SHIELD, PARTICULARLY FOR ROLLING BEARINGS

BACKGROUND OF THE INVENTION

The present invention relates to a sealing shield of the type normally employed for protecting the rolling bodies of rolling-contact bearings.

For protecting the rolling bodies of rolling-contact bearings, provision is made between the bearing rings for annular rubber/metal sealing shields comprising a rigid intermediate supporting portion, and two opposite soft peripheral sealing portions, the inner one of which provides for sliding or labyrinth sealing, and the outer one for static sealing of the other ring, as well as for connecting the sealing shield to the ring itself.

Rigid shields made of synthetic plastic material have also been employed as sealing elements. These, however, are subject in use to severe thermal expansion, so that, when hot, they are permanently deformed and squashed inside the seat, and, when cold, either work out of the seat and become lost or at any rate fail to provide for effective sealing action.

SUMMARY OF THE INVENTION

It is an object of the present invention to provide a sealing shield, particularly for rolling bearings, which is cheap and easy to produce, lightweight, and which, when hot, is not subject to thermal expansion such as to deform it permanently.

According to the present invention, there is provided a sealing shield, particularly for rolling bearings, of the type comprising relatively soft, elastic peripheral portions and a relatively rigid intermediate portion; characterized by the fact that said intermediate portion consists of a single rigid annular insert formed from a synthetic plastic polymer; and by the fact that said relatively soft peripheral portions are co-molded on to said annular insert; said peripheral portions being respectively secured to said annular insert at a first peripherally outer edge and a second peripherally inner edge; and said peripheral portions being formed from a mixture of an elastomer and the same synthetic plastic polymer from which said annular insert is formed.

BRIEF DESCRIPTION OF THE DRAWING

A non-limiting embodiment of the present invention will be described by way of example with reference to the accompanying drawing, which shows a partial section of a rolling bearing featuring a sealing shield in accordance with the present invention.

DETAILED DESCRIPTION OF THE INVENTION

Number 1 in the accompanying drawing indicates a known rolling bearing comprising an outer ring 2; an inner ring 3; a number of rolling bodies 4 (in the example shown, balls, of which only one is shown for the sake of simplicity) interposed between outer ring 2 and inner ring 3; and at least one annular sealing shield 5 located between rings 2 and 3, for protecting rolling bodies 4.

As shown in the accompanying non-limiting drawing, annular shield 5 comprises relatively soft, elastic peripheral sealing portions 6, 7; and a relatively rigid intermediate portion 8 connecting portions 6 and 7.

According to the present invention, intermediate portion 8 consists of a single rigid annular insert formed from a synthetic plastic polymer, and independent peripheral portions 6 and 7 are co-molded on either side of intermediate portion 8.

More specifically, peripheral portions 6 and 7 are preferably formed as independent elements; are secured respectively to a first peripherally outer edge 11 and second peripherally inner edge 12 of intermediate portion 8; and are formed from a mixture of an elastomer and the same synthetic plastic polymer, from which intermediate portion 8 is formed.

According to the present invention, intermediate portion 8 is preferably formed from one of a group of synthetic plastic materials including polypropylene, polyamide, polyethylene; while peripheral portions 6 and 7, in addition to one of the above synthetic plastic materials, also contain an elastomeric material preferably selected from a group including EPDM-based "TREFSIN" (registered trademark) or "SANTOPRENE" (registered trademark), nitrile-rubber-based (NBR) "GEOLAST" (registered trademark), "KELPROX" (registered trademark), EPDM-based "VESTOPREN" (registered trademark) and "TELCAR" (registered trademark), and an fluorocarbon rubber based (FKM) material produced by 3M FLUOREL, a trade name of 3M.

Intermediate portion 8 presents a trapezoidal radial section with two projections 13 and 14 at respective opposite ends 15 and 16 of the longer side 17 of trapezium 18; and peripheral portions 6 and 7 are secured to intermediate portion 8 at the peripherally outer and inner edges 11 and 12 defined by respective opposite oblique sides 21 and 22 of trapezium 18.

Projections 13 and 14 present respective inner surfaces 23 and 24 opposite longer side 17, facing rolling bodies 4, and covered by respective appendixes 25 and 26 of peripheral sealing portions 6 and 7, for increasing the anchoring surface of portions 6 and 7 on intermediate portion 8.

In addition to its sealing function, the radially-outermost peripheral portion 6 also provides for connecting shield 5 to a mechanical member (outer ring 2 of rolling bearing 1 in the example shown) and, like inner peripheral portion 7, is shaped in the form of V-shaped lip arranged transversely in relation to the opposite outer and inner front faces 27 and 28 of shield 5, with its concavity facing outwards.

More specifically, peripheral portions 6 and 7 present respective root portions 31 and 32 having respective oblique surfaces 33 and 34 contacting oblique sides 21 and 22 of trapezium 18.

In use, an end portion 35 of peripheral portion 6, opposite root portion 31 and housed in an annular seat 36, contacts and cooperates with outer ring 2 of rolling bearing 1 for sealing and supporting shield 5; while an end portion 37 of inner peripheral portion 7, opposite root portion 32, cooperates in sliding manner with surface 38 of inner ring 3 of bearing 1, parallel to the axis of symmetry (not shown) of bearing 1, for sealing and so protecting rolling bodies 4.

The advantages of the present invention will be clear from the foregoing description. Using two synthetic plastic materials of the same chemical nature, and one softer than the other by virtue of also containing elastomeric material, provides for molding the intermediate annular insert together with the peripheral portions, thus enabling the formation of lightweight, low-cost sealing shields with an acceptable degree of thermal expansion, and the deformation of which remains at all times within the elastic range and is never such as to impair operation of the bearing.

The particular V-shaped design of the peripheral portions also provides for optimum anchorage of the sealing shield by the outer peripheral portion housed inside the annular seat on the outer ring of the bearing, as well as for absorption, by both peripheral portions, of most of the deformation of the shield resulting from thermal expansion by the heat produced on the bearing.

We claim:

1. A sealing shield for rolling bearings, the shield being comprised of relatively soft, elastic peripheral portions and a relatively rigid intermediate portion; and
   (i) said intermediate portion comprising a single, rigid annular insert formed from a synthetic plastic polymer and delimited on the opposite sides, with respect to its own axis, by an inner edge and by an outer edge, respectively; and
   (ii) said elastic peripheral portions being formed as separate parts, independent of each other, from a mixture of an elastomer and the same synthetic plastic polymer of said annular insert; a first of said peripheral portions being secured in one piece to said outer edge of the annular insert and a second of said peripheral portions being secured to said inner edge of the annular insert;
   (iii) said annular insert presenting an elongated radial section with two projections at respective opposite ends of a longer side; said peripheral portions being secured to respective sides of the projections and said projections being covered by respective appendices of said peripheral portions; and
   (iv) the annular insert being the sole connection between the two opposite peripheral portions.

2. A sealing shield as claimed in claim 1, wherein said annular insert presents a trapezoidal radial section with the two projections at respective opposite ends of the longer side; said peripheral portions being secured to respective oblique sides of the trapezoid.

3. A sealing shield for rolling bearings according to claim 1, wherein the peripheral portions are secured to the annular insert without adhesives by co-moulding.

4. A sealing shield for rolling bearings according to claim 1, wherein the connection between the peripheral portions and the intermediate insert is obtained by co-moulding the peripheral portions directly onto said edges of the insert.

5. A sealing shield as claimed in claim 1, wherein said peripheral portions are in the form of respective V-shaped lips, a first lip corresponding to said outer peripheral portion, and a second lip corresponding to said inner peripheral portion; said lips being arranged transversely in relation to two opposite front faces of said intermediate portion; said faces being respectively a first inner face and a second outer face; and said lips being arranged with their respective concavities facing an outer portion of said bearing.

6. A sealing shield as claimed in claim 5, wherein said first lip presents an end portion contacting and cooperating with an annular seat formed in said outer ring of said bearing.

7. A sealing shield as claimed in claim 5, wherein an end portion of said second lip cooperates in sliding manner with a respective surface of said inner ring of said bearing.

8. A sealing shield as claimed in claim 1, wherein said annular insert is formed from one of a group of synthetic plastic materials consisting of: polypropylene, polyamide, and polyethylene.

9. A sealing shield as claimed in claim 8, wherein said peripheral portions contain an elastomer selected from a group consisting of: EPDM-based materials, nitrile-rubber-based (NBR) materials; and fluorocarbon rubber based (FKM) materials.

* * * * *

UNITED STATES PATENT AND TRADEMARK OFFICE
CERTIFICATE OF CORRECTION

PATENT NO. : 5,383,728
DATED : January 24, 1995
INVENTOR(S) : Mario MICCA et al.

It is certified that error appears in the above-indentified patent and that said Letters Patent is hereby corrected as shown below:

Title page, item
[73] Assignee: please delete "Industries" and insert therefor --Industrie--.

Signed and Sealed this

First Day of August, 1995

Attest:

BRUCE LEHMAN

Attesting Officer     Commissioner of Patents and Trademarks